(12) United States Patent
Cho et al.

(10) Patent No.: US 6,407,981 B1
(45) Date of Patent: Jun. 18, 2002

(54) DISC CARTRIDGE ADAPTER AND DISC DRIVER FOR DRIVING THE SAME

(75) Inventors: Won Hyoung Cho, Seoul; Jong Rak Lim, Kyunggi-do; Hong Soo Park, Seoul, all of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/347,518

(22) Filed: Jul. 2, 1999

(30) Foreign Application Priority Data

Jul. 4, 1998 (KR) .............................................. 98-27023

(51) Int. Cl.[7] ........................... G11B 23/03; G11B 23/04
(52) U.S. Cl. ....................... 369/289; 369/77.2; 369/291
(58) Field of Search .................... 360/133, 94; 369/291, 369/289, 77.2

(56) References Cited

U.S. PATENT DOCUMENTS

| | | | | |
|---|---|---|---|---|
| 5,048,008 A | * | 9/1991 | Haruna | 369/291 |
| 5,331,627 A | * | 7/1994 | Childers et al. | 369/291 |
| 5,570,342 A | * | 10/1996 | Kosaka | 369/291 |
| 5,715,233 A | * | 2/1998 | Yoshida et al. | 369/289 |
| 5,867,476 A | * | 2/1999 | Yoshida et al. | 369/289 |
| 5,923,630 A | * | 7/1999 | Yoshida et al. | 369/77.2 |

FOREIGN PATENT DOCUMENTS

| | | | |
|---|---|---|---|
| JP | 2-121174 | * | 5/1990 |
| JP | 2-187973 | * | 7/1990 |
| JP | 8-180636 | * | 7/1996 |
| JP | 9-293349 | * | 11/1997 |
| JP | 10-269737 | * | 10/1998 |

* cited by examiner

Primary Examiner—William Klimowicz
(74) Attorney, Agent, or Firm—Birch, Stewart, Kolasch & Birch, LLP

(57) ABSTRACT

A disc cartridge adapter that is capable of driving a different size of disc cartridges with the same disc driver. In the adapter, a driving power transfer device absorbs a difference in a shutter travel range having a different size from each other to drive shutters of a small-scale disc cartridge. A body is provided with a receiving space for receiving the small-scale cartridge. Accordingly, the small-scale cartridge can be driven with a disc driver for driving a large-scale cartridge.

15 Claims, 13 Drawing Sheets

DISC CARTRIDGE ADAPTER AND DISC DRIVER FOR DRIVING THE SAME

BACKGROUND OF THE INVENTION

1. Field of the Invention

This invention relates to a disc cartridge within which a disc-type optical recording medium is received, and more particularly to a disc cartridge adapter for permitting a different size of disc cartridge to be driven with the same disc driver. Also, the present invention is directed to a disc driving apparatus capable of driving a different size of disc cartridge.

2. Description of the Related Art

Generally, an optical disc is classified into a read-only type disc, such as CD-ROM and DVD-ROM, etc., and a recordable type disc, such as WROM(write once read many) type, rewritable type and RAM type, etc. according to the number of times rewritable. In the read-only type optical disc, a data is recorded in the shape of embossed pits and reproduced in a large quantity. The recordable type optical disc has a recording face fragile to contamination due to dust, fingerprint and the like or a damage due to scratch, etc. In other words, if the recordable type optical disc is contaminated or damaged, then the recording face at a contaminated portion or a damaged portion thereof fails to be heated into a sufficient temperature at the time of recording, so that it becomes difficult to record a data accurately. For this reason, the recordable type optical disc is generally received within a disc cartridge so as to protect an optical disc from a contamination or damage to the exterior thereof.

As shown in FIG. 1, a disc cartridge includes a body 2 in which an opening 6 is defined and within which an optical disc 1 is rotatably received, and a shutter 4 for opening the opening 6. The opening 6 plays a role to expose a recording/reproducing face of the optical disc 1 when the disc cartridge is loaded into a disc driver(not shown) The shutter 4 is driven with a shutter opener installed within the disc driver to open the opening 6. On the other hand, the shutter 4 shuts off the opening 6 by a restoring force of an elastic member as far as an external force is exerted thereon.

Generally, a disc cartridge used for a CD or a DVD, etc. receives an optical disc having a diameter of 120 mm. A large-scale cartridge which has received such an optical disc has been applied to stationary information equipment, but it is not suitable for a small-scale or portable information equipment because of its large dimension.

Recently, the optical disc has a tendency have to a high density and a large capacity, a small-sized optical disk (e.g., a diameter of 80 mm) suitable for the small-scale or portable information equipment has been developed and is commercially available. When a small-scale disc cartridge received with such a small-scale disc is compared with a large-scale disc cartridge, a movement range of the shutter thereof becomes smaller than that of the large-scale cartridge because its body size is small.

Meanwhile, the disc driver can be largely classified into an insertion load system and a tray load system. The disc driver of insertion load system loads a disc or a disc cartridge until a disc access position is reached by a user's force. Otherwise, the disc driver of tray load system includes a tray within which a disc or a disc cartridge is received, thereby driving the tray with a mechanical power to load a disc or a disc cartridge until a disc access position. Most stationary disc drivers have a structure suitable for the large-scale disc or the large-scale cartridge whether they are a insertion load system or a tray load system. In other words, in the most stationary disc drivers, a width of an inserting hole is set to correspond to that of the large-scale cartridge, and a loading mechanism including the shutter opener is designed on a basis of the large-scale cartridge. Accordingly, in order to assure a changeability between the small-scale cartridge and the large-scale cartridge, a width difference between the large-scale cartridge and the small-scale cartridge must be compensated.

FIG. 2 shows an adapter suggested in Japanese Patent Laid-open Gazette No. Pyung 9-293,349. In FIG. 2, the conventional adapter includes a body 34 which has received a small-scale cartridge 30, and a slider 36 for driving a shutter of the small-scale cartridge. The small-scale cartridge 30 is provided with a single shutter 32 like the large-scale cartridge shown in FIG. 1. A size of the body 34 holding the small cartridge 30 is equal to that in the large-scale cartridge. At the center of the body 34 a receiving space for receiving the small-scale cartridge 30 is provided. When the small-scale cartridge 30 is received within the receiving space of the body 34, the slider 36 is coupled with the shutter 32 of the small-scale cartridge. A protrusion 37 of the slider 36 is fit in a recess 33 defined at the shutter 32 of the small-scale cartridge 30.

When such an adapter is loaded into a disc driver designed on the basis of the large-scale disc or the large-scale cartridge, the slider 36 is linked to a shutter opener(not shown) to make a linear movement thereof. Then, the shutter 32 of the small-scale shutter 30 is linearly moved along with the slider 36 to open the opening. More specifically, if an adapter that has received the small-scale cartridge 36 is loaded into the disc driver, then the slider 36 is linked to the shutter opener installed within the disc driver to be linearly moved in a side direction by a travel range $S_{LCTR}$ of the large-scale cartridge. Then, the shutter 32 of the small-scale cartridge 30 is linearly moved by a desired travel range $S_{SCTR}$ along the slider 36 to open an opening.

However, the adapter shown in FIG. 2 has a problem in that, when the slider 36 has been linearly moved by a travel range $S_{LCTR}$ of the large-scale cartridge, the shutter 32 of the small-scale cartridge 30 fails to be linearly moved sufficiently enough that the opening is completely opened. This is caused by a fact that the slider 36 fails to sufficiently absorb a difference between a travel range $S_{LCTR}$ of the large-scale cartridge and a travel range of the shutter 32 of the small-scale cartridge 30. Accordingly, since a travel range of the shutter 32 is left after the slider 36 was moved by its travel range $S_{SCTR}$, an overload occurs at the loading mechanism including the shutter opener in the course of the loading operation. In this case, the adapter and the small-scale cartridge cannot be loaded into the disc driver, and the loading mechanism including the shutter opener may be damaged.

SUMMARY OF THE INVENTION

Accordingly, it is an object of the present invention to provide a disc cartridge adapter that permits a different size of disc cartridges to be driven with the same disc driver.

Further object of the present invention is to provide a disc driving apparatus that is capable of driving a different size of disc cartridges.

In order to achieve these and other objects of the invention, a disc cartridge adapter according to one aspect of the present invention includes driving power transfer means for absorbing a difference in a shutter travel range having a size different from each other to drive a shutter of a small-scale cartridge; and a body provided with a receiving space for receiving the small-scale cartridge.

A disc driving apparatus according to another aspect of the present invention includes a receiver for absorbing a shutter travel range difference between a large-scale cartridge and a small-scale cartridge to receive an adapter driving shutters of the small-scale cartridge; and drive means for driving the adapter.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
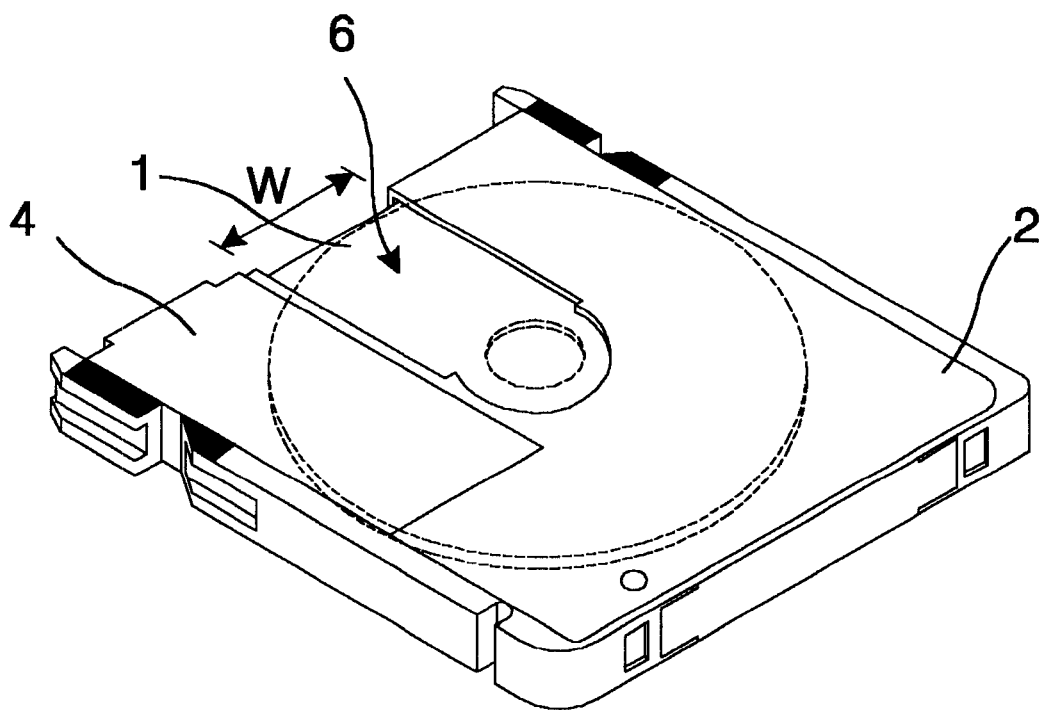
FIG. 1 is a perspective view of the structure of a large-scale disc cartridge.
Figure 2:
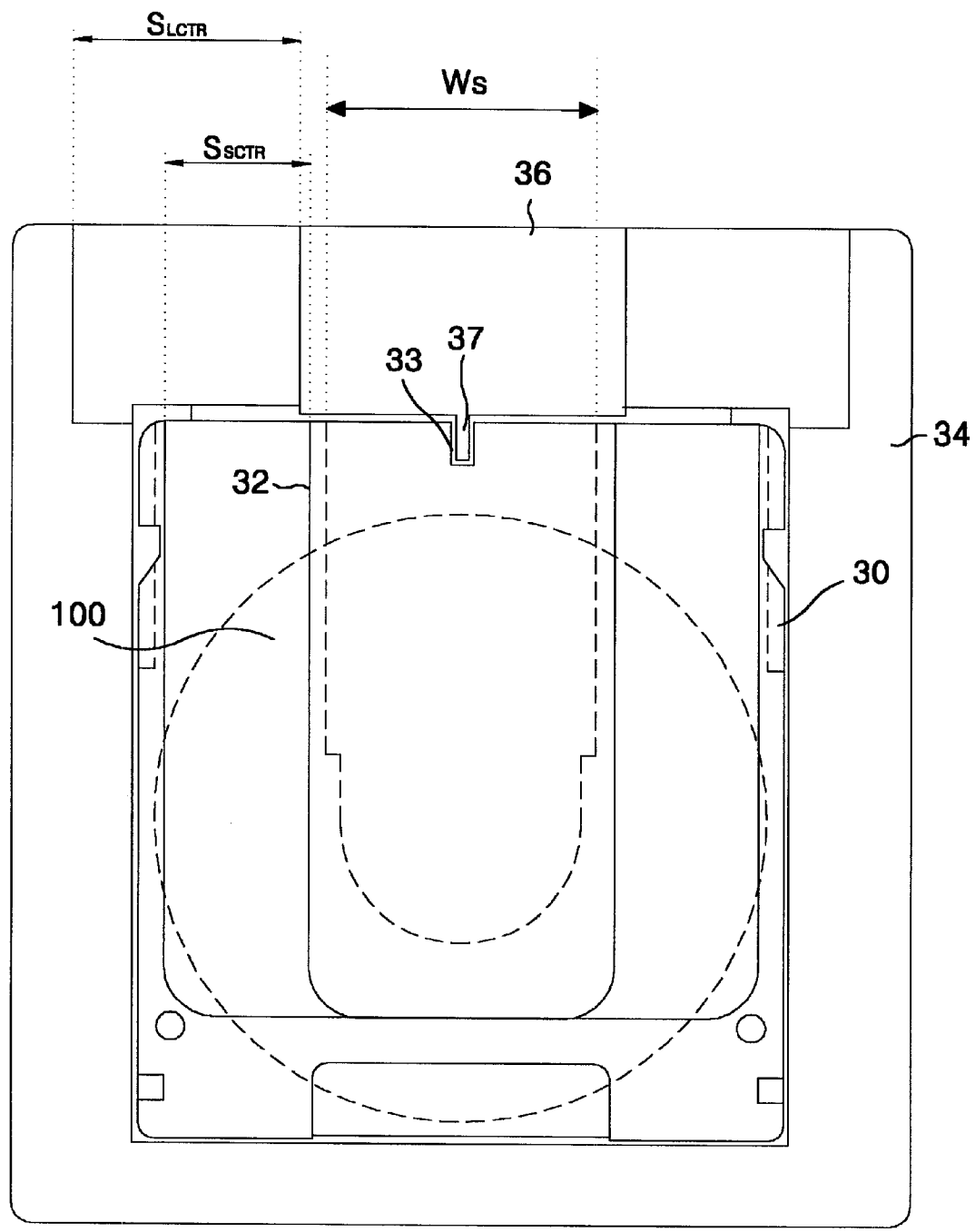
FIG. 2 is a plan view of the structure of a conventional adapter.
Figure 3:
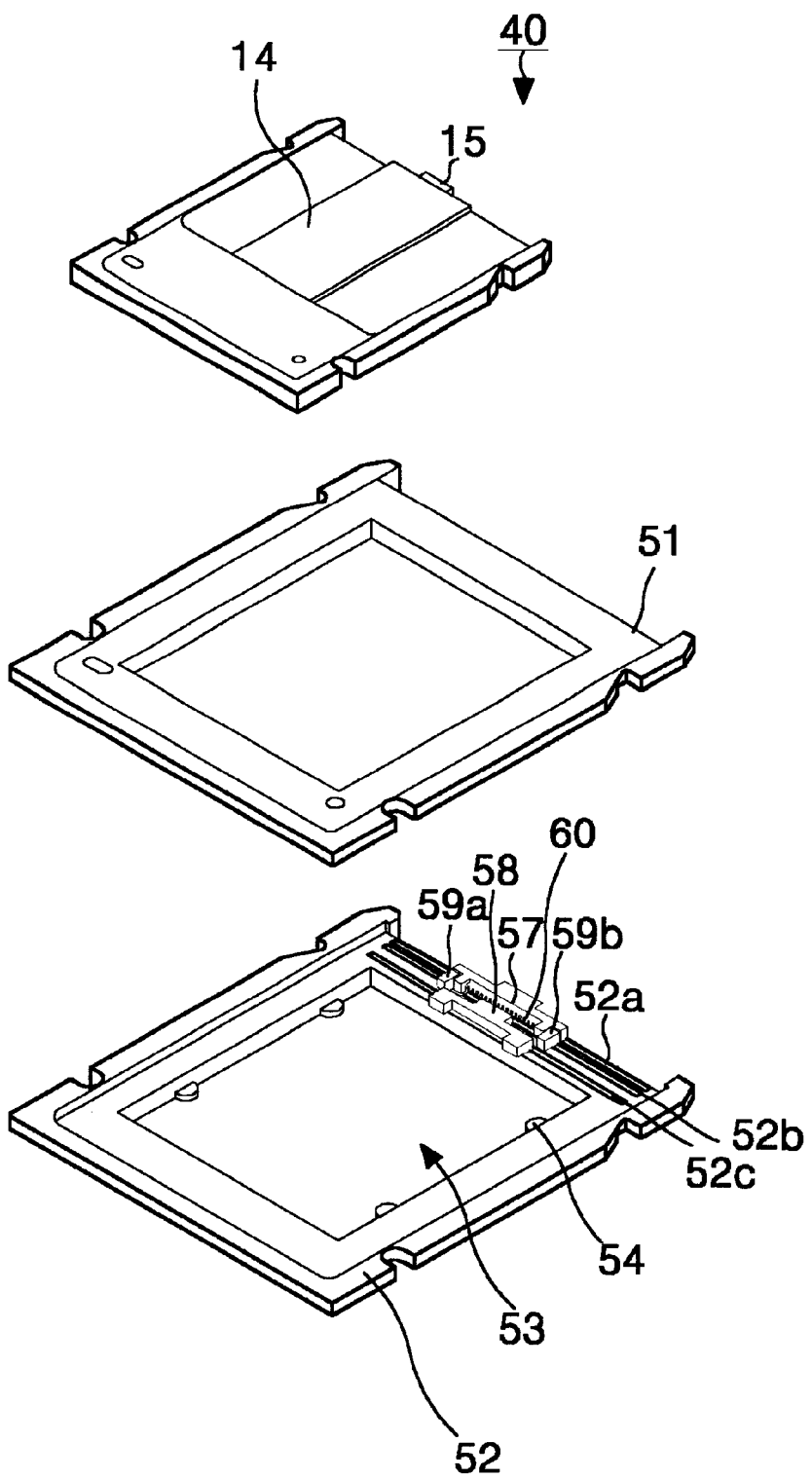
FIG. 3 is an exploded perspective view of a disc cartridge adapter according to a first embodiment of the present invention.
Figure 4:
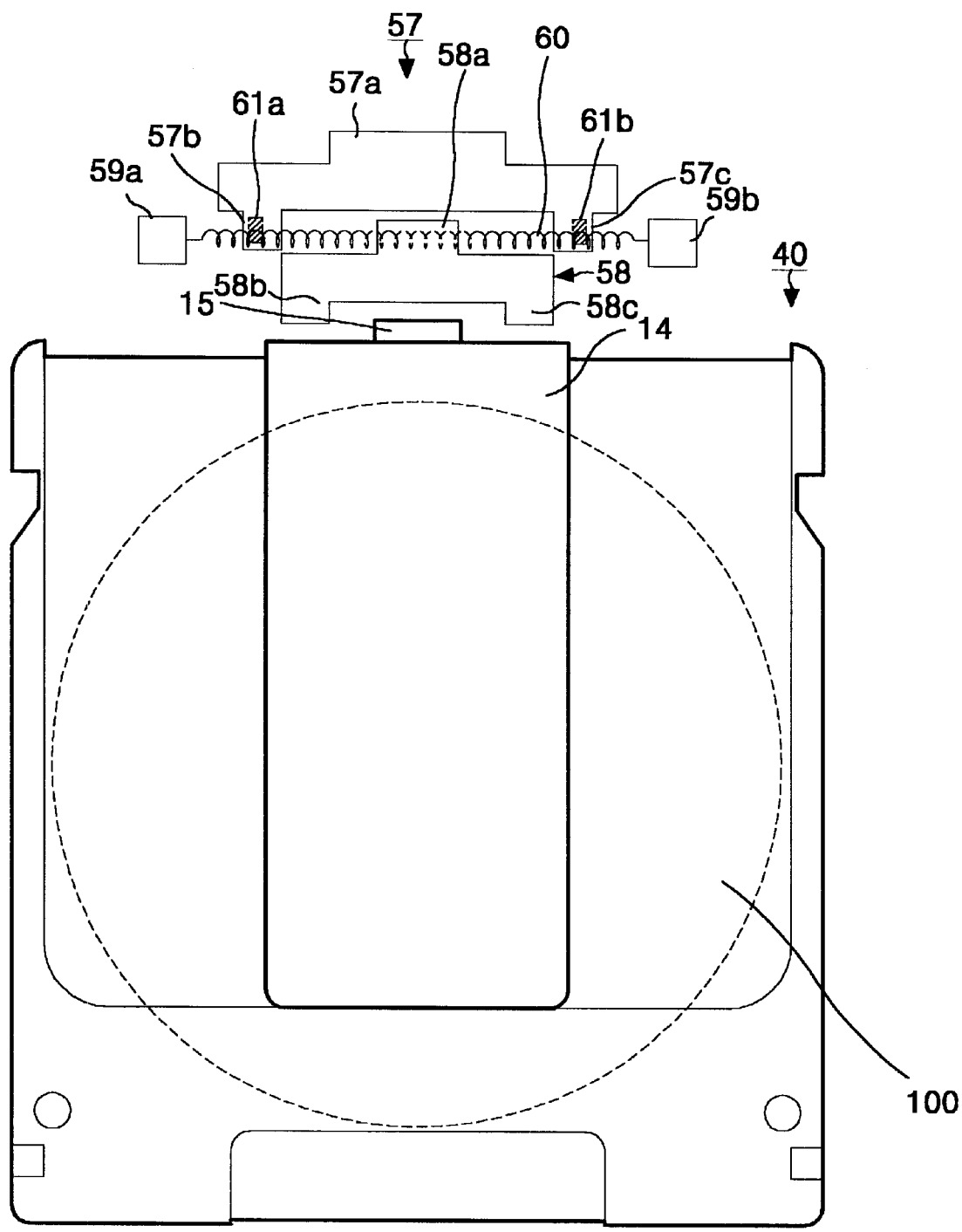
FIG. 4 is a plan view of the disc cartridge adapter depicted in FIG. 3.

Referring to FIGS. 3 and 4, there is shown a disc cartridge adapter according to the first embodiment of the present invention. The disc cartridge adapter includes upper and lower plates 51 and 52 provided with a square receiving hole 53 for receiving a small-scale cartridge 40, a first slider 57 being linear-movably installed at the upper part of the lower plate 52, support sliders 59a and 59b and a spring 60 for applying a restoring force to the first slider 57, and a second slider being linked to the first slider 57 to drive a shutter head of the small cartridge 40. First to third guide holes 52a, 52b and 52c are formed in parallel at the upper part of the lower plate 52. Also, the lower plate is provided with stoppers 61a and 61b for limiting a travel range of the support sliders 59a and 59b. The stoppers 61a and 61b take a protruded shape.

A number of protrusions 54 is formed at the edge of the square receiving hole 53 defined at the upper and lower plates 51 and 52. These protrusions are responsible for supporting the small-scale cartridge 40 when the small-scale cartridge 40 has been received within the square-receiving hole 53. In the first slider 57, a head 57a is protruded from the center of the upper end and arms 57b and 57c are protruded from each side of the lower end. The first slider 57 is linear-movably fit in the first guide hole 52a of the lower plate 52. The support sliders 59a and 59b are connected to each other by the spring 60 and are linear-movably fit in the second guide hole 52b in a state of being restrained to the arms 57b and 57c of the first slider 57. These support sliders 59a and 59b are moved along the first slider 57 when the first slider 57 is traveled in any one direction. The spring 60 is responsible for returning the first slider 57 and the support sliders 59a and 59b into an original position by being pressurized by a restoring force when an external force is not exerted on the first slider 57 and the support sliders 59a and 59b after it was expanded by the support sliders 59a and 59b. The second slider 58 is linear-movably fit in the third guide hole 52c in a state in which the head 58a is positioned between the arms 57b and 57c of the first slider 57. The second slider 58 is linked to the first slider to drive the shutter head 15 of the small-cartridge 40.

Figure 5:
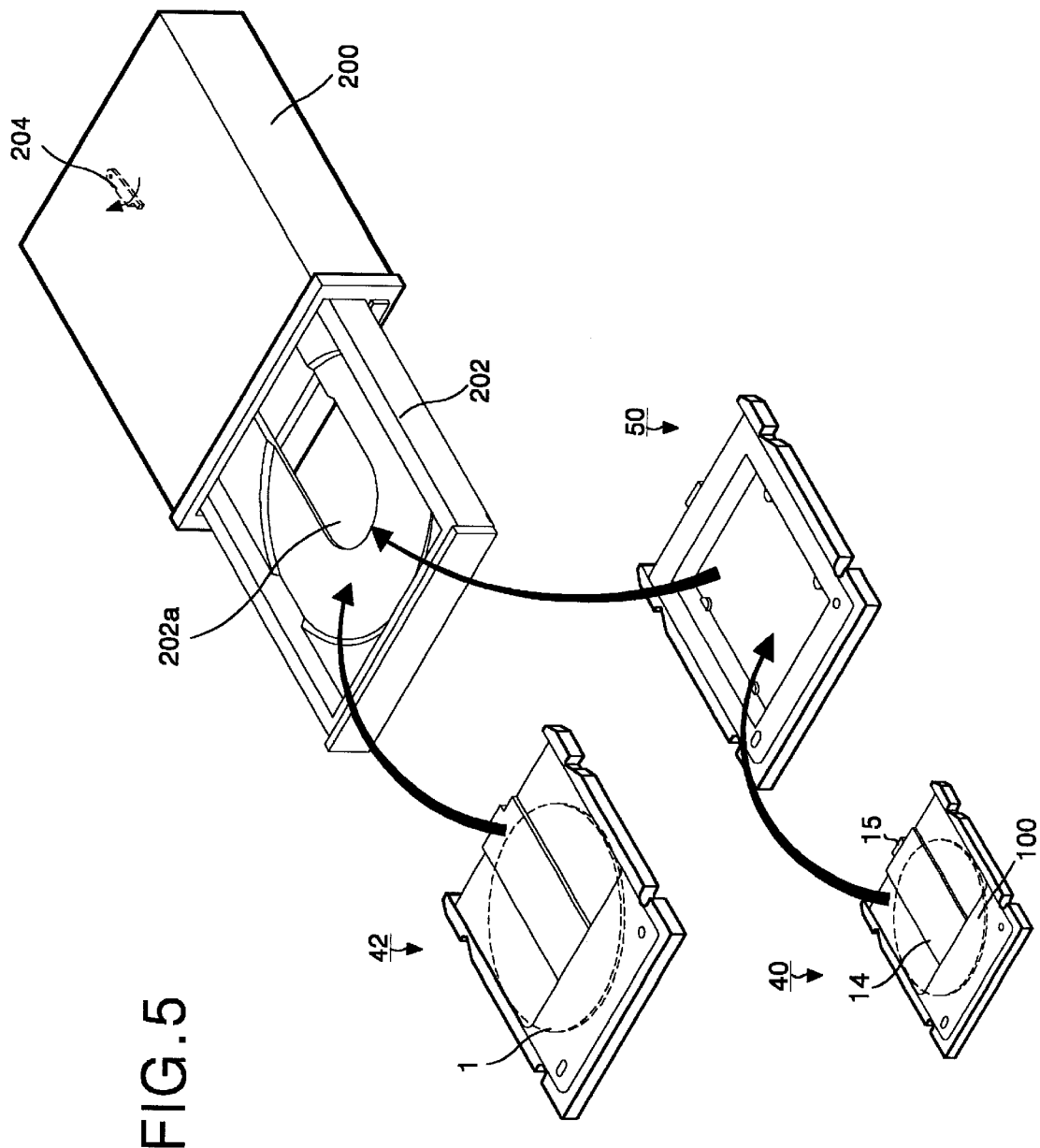
FIG. 5 is a perspective view depicting a procedure in which the large-scale cartridge and the disc cartridge adapter shown in FIG. 3 are driven with a single disc driver.

Such a disc cartridge adapter is loaded into a disc driver 200 after the small cartridges 40 is received as shown in FIG. 5. A loading mechanism including a tray 202 and a shutter opener 204 is installed to the disc driver 200. The shutter opener 204 is determined a pivot angle thereof on a basis of the shutter travel range of the large-scale cartridge 42. A receiving hole 202a with a size capable of being received with the large-scale cartridge 42 is formed at the upper surface of the tray 202. The tray 202 is linearly moved into the inside and outside of the disc driver 200 by the loading mechanism within the disc driver 200, thereby moving the large-scale cartridge 42 or the disc cartridge adapter 50 into the inside and outside of the disc driver 200.

Figure 6:
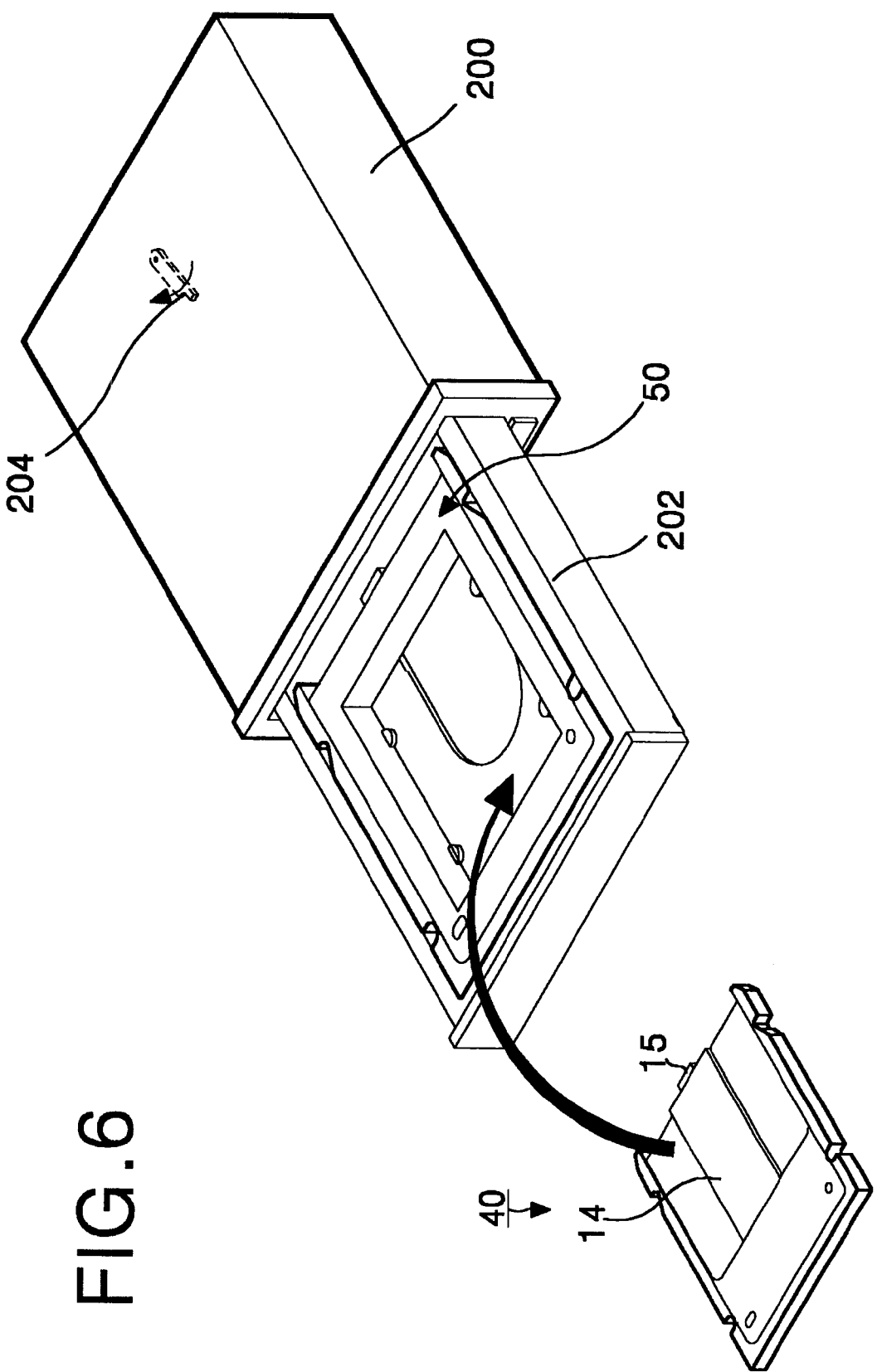
FIG. 6 is a perspective view depicting a state in which the disc cartridge adapter shown in FIG. 3 is received within the tray shown in FIG. 5.

After the small-scale cartridge 40 is received within the disc cartridge adapter 50 as shown in FIG. 6, the loading mechanism is driven when a force is applied from the tray 202 into the disc driver 200. The loading mechanism is driven and then the tray 202 is linked by the loading mechanism to be linearly moved into the inside of the disc driver 200. At a certain time in the course of the linear movement of the tray 202, the head 57a of the first slider 57 is contacted with the shutter opener 204 and then restrained. At this time, if the tray 202 continues to be linearly moved into the inside of the disc driver 200, then the shutter opener 204 is linked to the linear movement of the tray 202 and rotated in a clockwise direction. At a time of the loading termination, the shutter opener 204 is rotated by a pivot angle corresponding to a shutter travel range of the large-scale cartridge 42, and the first slider 57 is linked to the shutter opener 204 to be linearly moved by the shutter travel range of the large-scale cartridge 42. The second slider 58 is moved by a shutter travel range of the small-scale cartridge 42 to move the shutter 14 of the small-scale cartridge 40. Accordingly, the first and second sliders 57 and 58 absorb a difference between the shutter travel range of the large-scale cartridge 42 and the shutter travel range of the small-scale cartridge 40 to open the shutter 14 of the small-scale cartridge 40.

Figure 7:
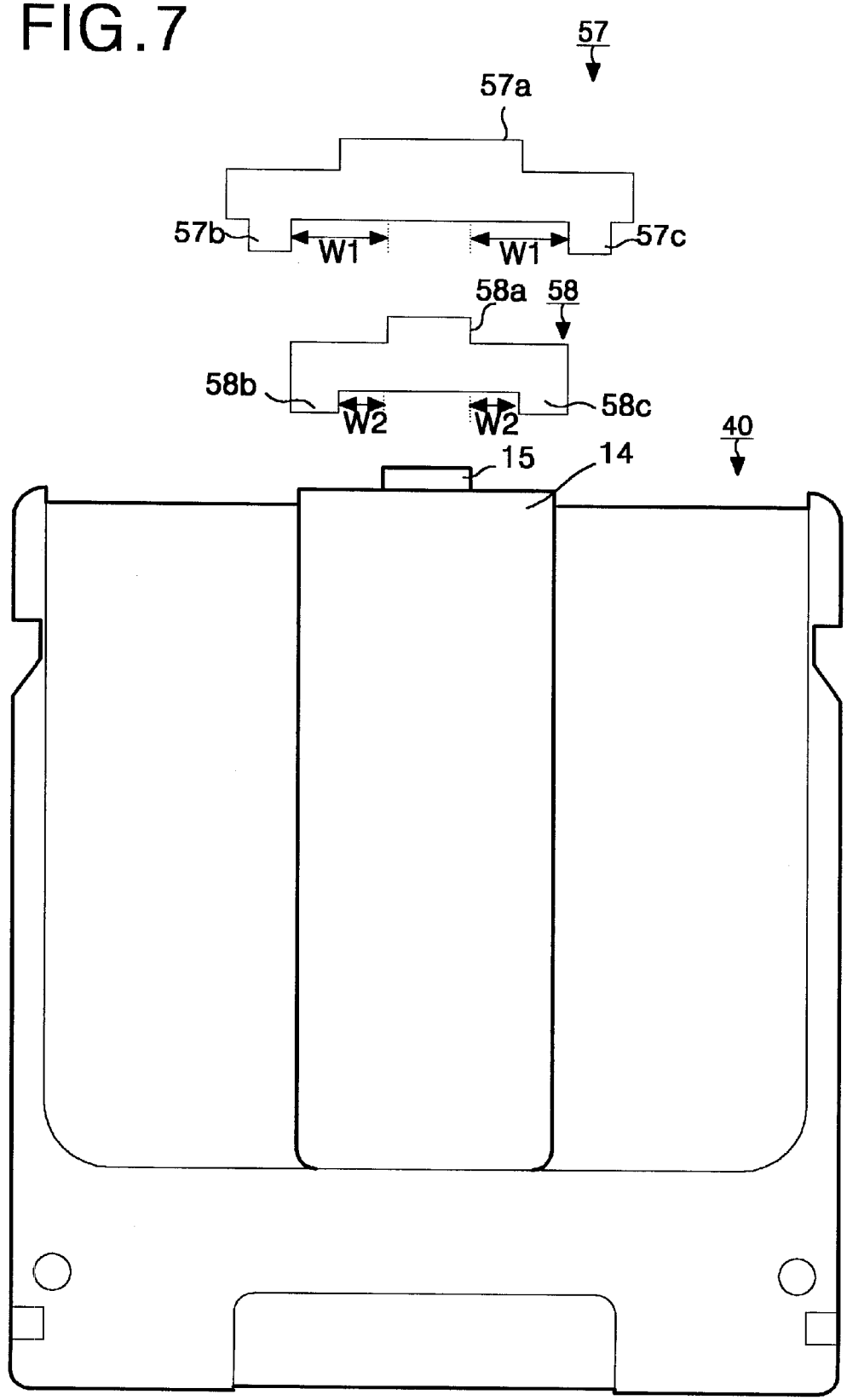
FIG. 7 is a plan view representing a travel range amount absorbed by the disc cartridge adapter depicted in FIG. 3.

Referring now to FIG. 7, assuming that a width between the arms 57b and 57c of the first slider 57 and the head 58a of the second slider 58 is W1 and a width between the arms 58b and 58c of the second slider 58 and the shutter head of the small-scale cartridge 40 is W2, the first and second sliders 57 and 58 absorb a travel range corresponding to W1+W2 on a basis of the shutter travel range of the large-scale cartridge 42. As described above, the first and second sliders 57 and 58 absorb a difference in the travel range, so that a single disc driver can drive the large-scale cartridge 42 and the small-scale cartridge 40.

Figure 8:
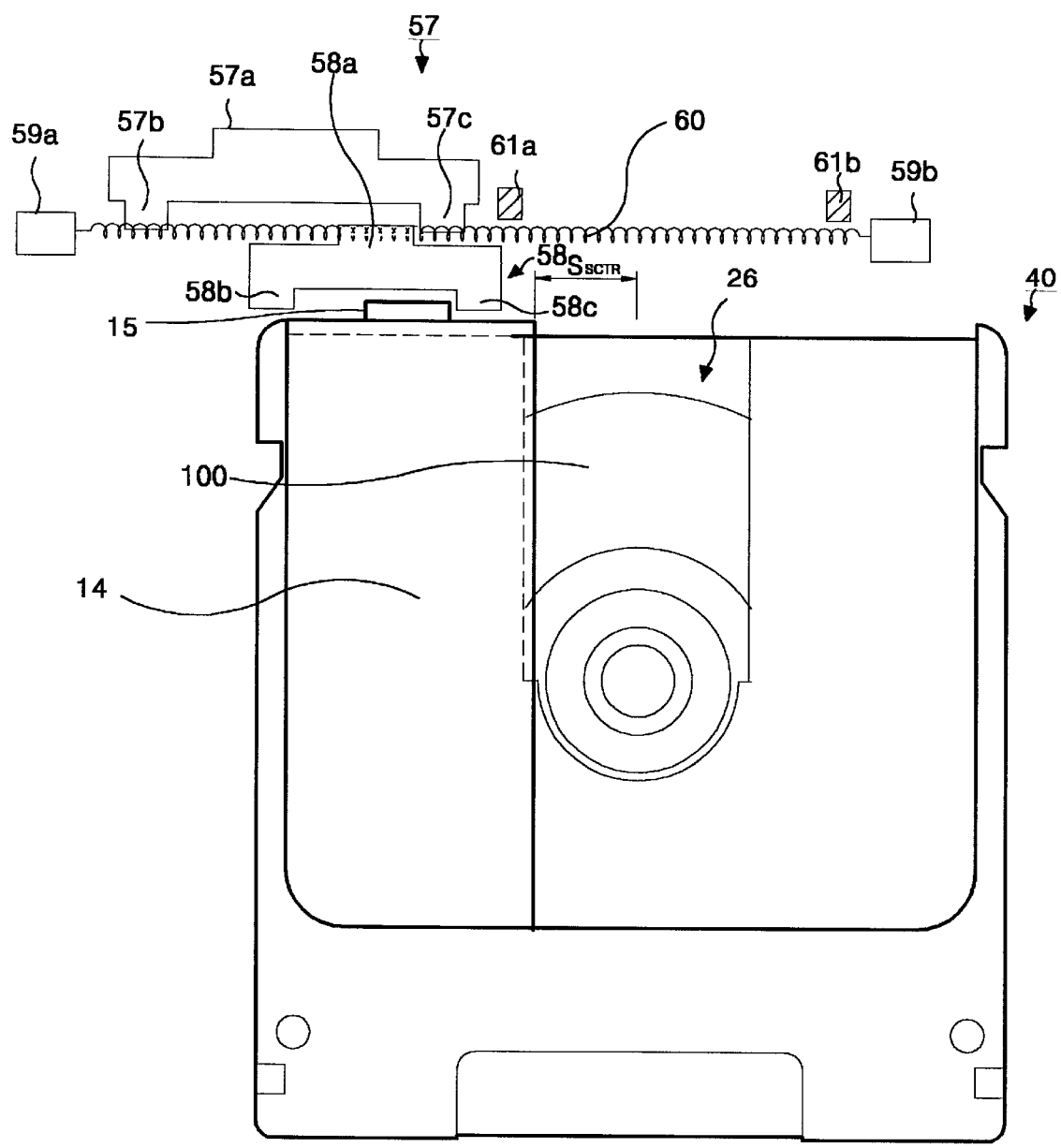
FIG. 8 is a plan view depicting an operation of the disc cartridge adapter in FIG. 3.

Referring to FIG. 7 and FIG. 8, when the first slider 57 is moved to the left by W1, the right arm 57c of the first slider 57 contacts the head 58a of the second slider 58. The second slider 58 is moved to the left along the first slider 57 at this instant. Subsequently, when the second slider 58 is moved to the left by W2, the right arm 58c of the second slider 58 contacts the shutter head 15 of the small-scale cartridge 40. At this instant, the shutter head 15 of the small-scale cartridge 40 is moved to the left along the second slider 58. At the same time, the shutter 14 of the small-scale cartridge 40 is moved to the left and the opening 26 is opened exposing disc 100. A shutter travel range $S_{SCTR}$ of the small-scale cartridge 40 corresponds to a travel amount given by subtracting W1+W2 from the shutter travel range of the large-scale cartridge 42.

If the small-scale disc within the small-scale cartridge 40 is converted into an eject mode after being recorded or reproduced, then the loading mechanism is loaded and, at the same time, the tray 202 is moved to the outside of the disc driver 200. When the tray 202 arrives at a certain time point in the course of the movement to the outside thereof, the first slider 57 becomes free from a restraint of the shutter opener 204. At this time, the first and second sliders 57 and 58 are returned into the original position by a restoring force of the spring 60, and the shutter 14 of the small-scale cartridge 40 shuts off the opening 26.

Figure 9:
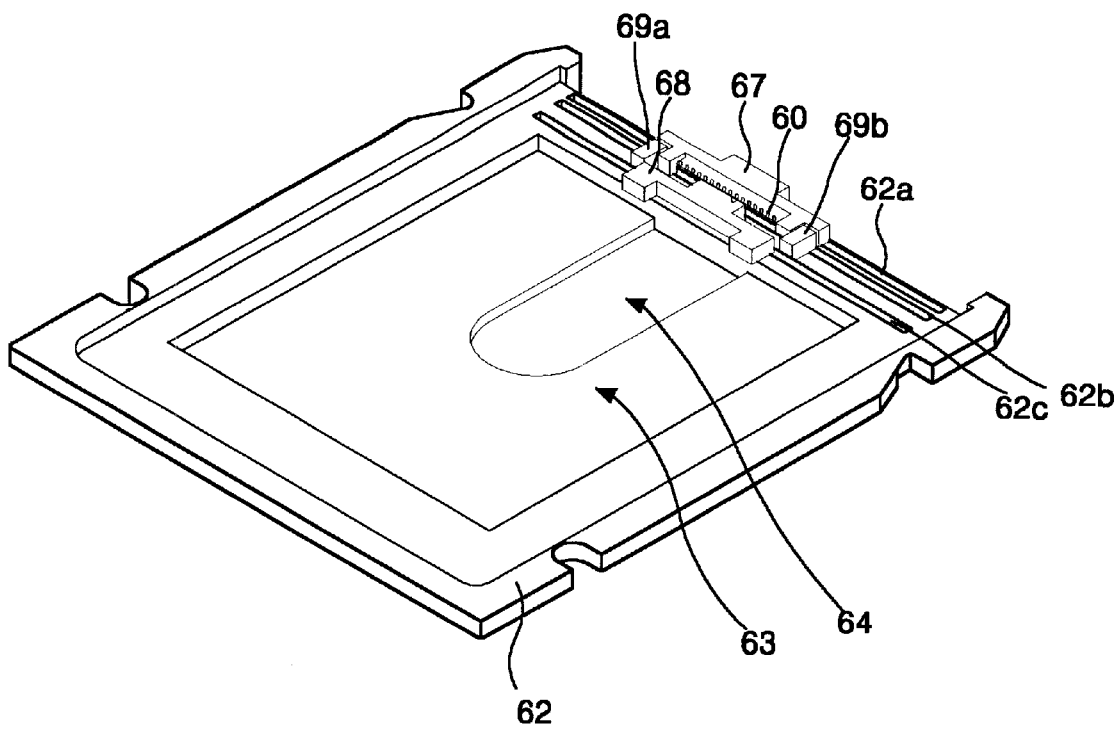
FIG. 9 is a perspective view depicting the structure of a disc cartridge adapter according to a second embodiment of the present invention.

Referring to FIG. 9, there is shown a disc cartridge adapter according to a second embodiment of the present invention. The disc cartridge adapter includes a lower plate 62 provided with a square receiving hole 63 for receiving a small-scale cartridge 40, a first slider 67 being linear-movably installed at the upper part of the lower plate 62, support sliders 69a and 69b linked to the first slider, a spring 70 installed between the support sliders 69a and 69b, and a second slider 68 linked to the first slider 67 to drive a shutter head 15 of the small cartridge 40. First to third guide holes 62a, 62b and 62c are formed in parallel at the upper part of the lower plate 62. The first slider 67, the support sliders 69a and 69b and the second slider 68 are linear-movably fit in the first to third guide holes 62a, 62b and 62c, respectively. A stopper (not shown) for limiting a travel range of the support sliders 69a and 69b is formed at the lower plate 62. The square-receiving hole 63 supports the small-scale cartridge 40. The opening 64 is formed at the bottom of the square-receiving hole 63. The first slider 67, the support sliders 69a and 69b, the second slider 68 and the spring 70 have the same function and structure as those shown in FIG. 6 and FIG. 7. Accordingly, the first and second sliders 67 and 68 absorb a travel range corresponding to W1+W2 to move the shutter 14 of the small-scale cartridge 40 as shown in FIG. 7.

Figure 10:
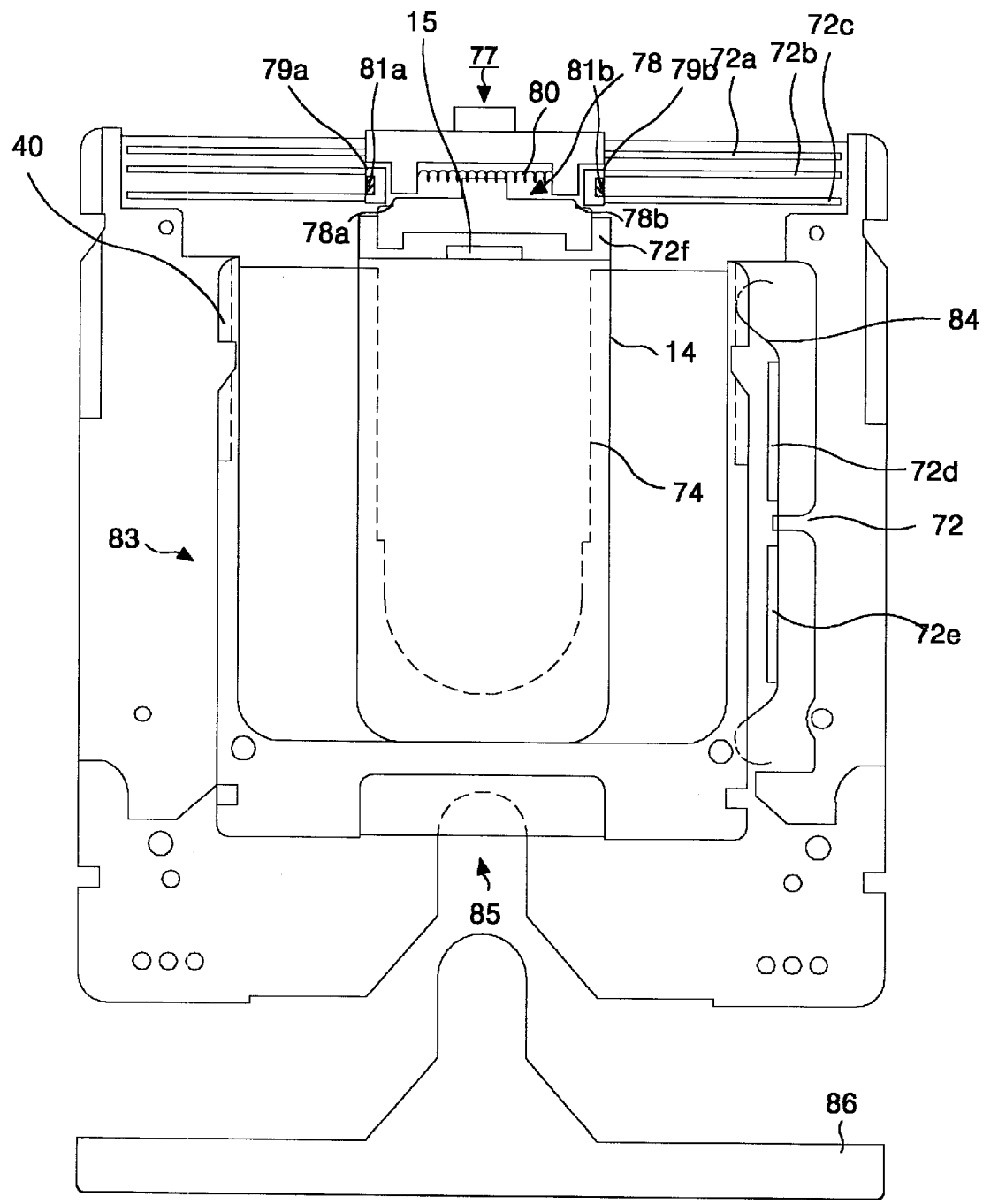
FIG. 10 is a plan view depicting the structure of a disc cartridge adapter according to a third embodiment of the present invention.
Figure 11:
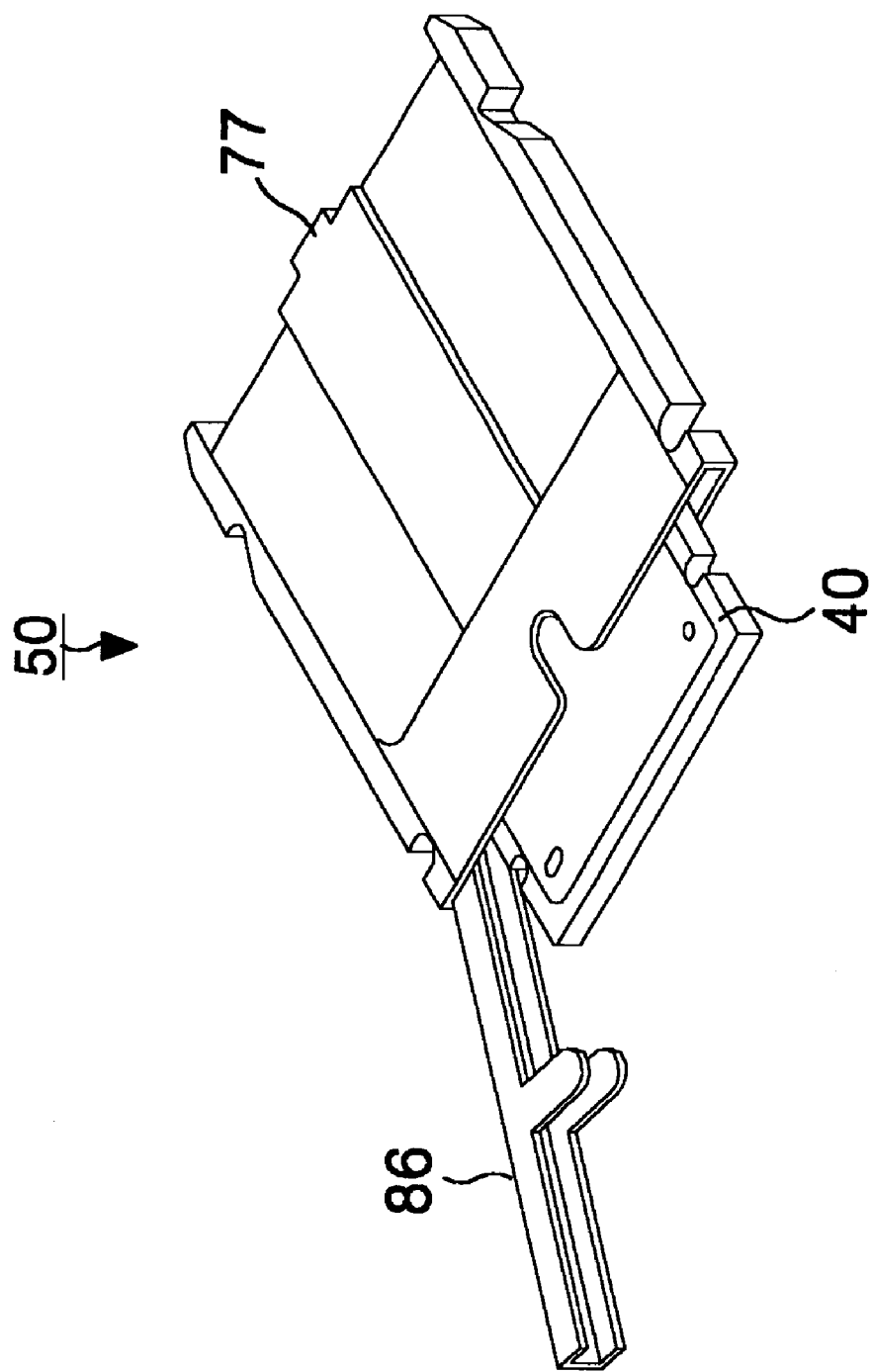
FIG. 11 is a perspective view depicting the holder in FIG. 10 coupled to the body in a hinge shape.

Referring to FIG. 10, there is shown a disc cartridge adapter according to the third embodiment of the present invention. The disc cartridge adapter includes a lower plate 72 provided with a cartridge inserting hole 85 for inserting a small-scale cartridge 40 and a receiving space 83, for receiving a cartridge, a first slider 77 installed linear-movably at the upper part of the lower plate 72, support sliders 79a and 79b and a spring 80 for applying a restoring force to the first slider 77, a second slider 78 linked to the first slider 77 to drive a shutter head 15 of the small-scale cartridge 40, a leaf spring 84 for aligning the small-scale cartridge 40 in one side direction, and a holder 86 for shutting off the cartridge inserting hole 85. At the lower plate 72 are formed parallel to the first to third guide holes 72a, 72b and 72c in which the first slider 77, the supporting sliders 79a and 79b and the second slider 78 are fit, respectively. An opening 72f is formed at the lower plate 72. Also, at the lower plate 72, stoppers 81a and 81b for limiting a travel range of the supporting slider 79a and 79b and ribs 72d and 72e for securing the leaf spring 84. The small-scale cartridge 40 is inserted into the receiving space 83 through the cartridge-inserting hole 85. The first slider 77 has the same structure and function as that shown in FIG. 3. The second slider 78 has the same structure and function as that shown in FIG. 3 except that concave jaws 78a and 78b are formed at the upper parts of each side thereof. accordingly, the first and second sliders 77 and 78 absorb a travel range corresponding to W1+W2 to move the shutter 14 of the small-scale cartridge 40. The supporting sliders 79a and 79b have their lower end restrained to the jaws 78a and 78b of the second slider 78, thereby restraining a motion of the second slider 78 and keeping the second slider 78 in position. Also, the support sliders 79a and 79b are responsible for returning the first and second sliders 77 and 78 into the original position thereof by a restoring force of the spring 80. The leaf spring 84 sticks the small-scale cartridge 40 to a sidewall of the lower wall 72 when the small-scale cartridge 40 is received within the receiving space, thereby aligning the small-scale cartridge 40. The holder 86 plays a role to open and close the cartridge-inserting hole 85. On the other hand, the holder 86 may coupled with an adapter body in a hinge structure as shown in FIG. 11.

Figure 12:
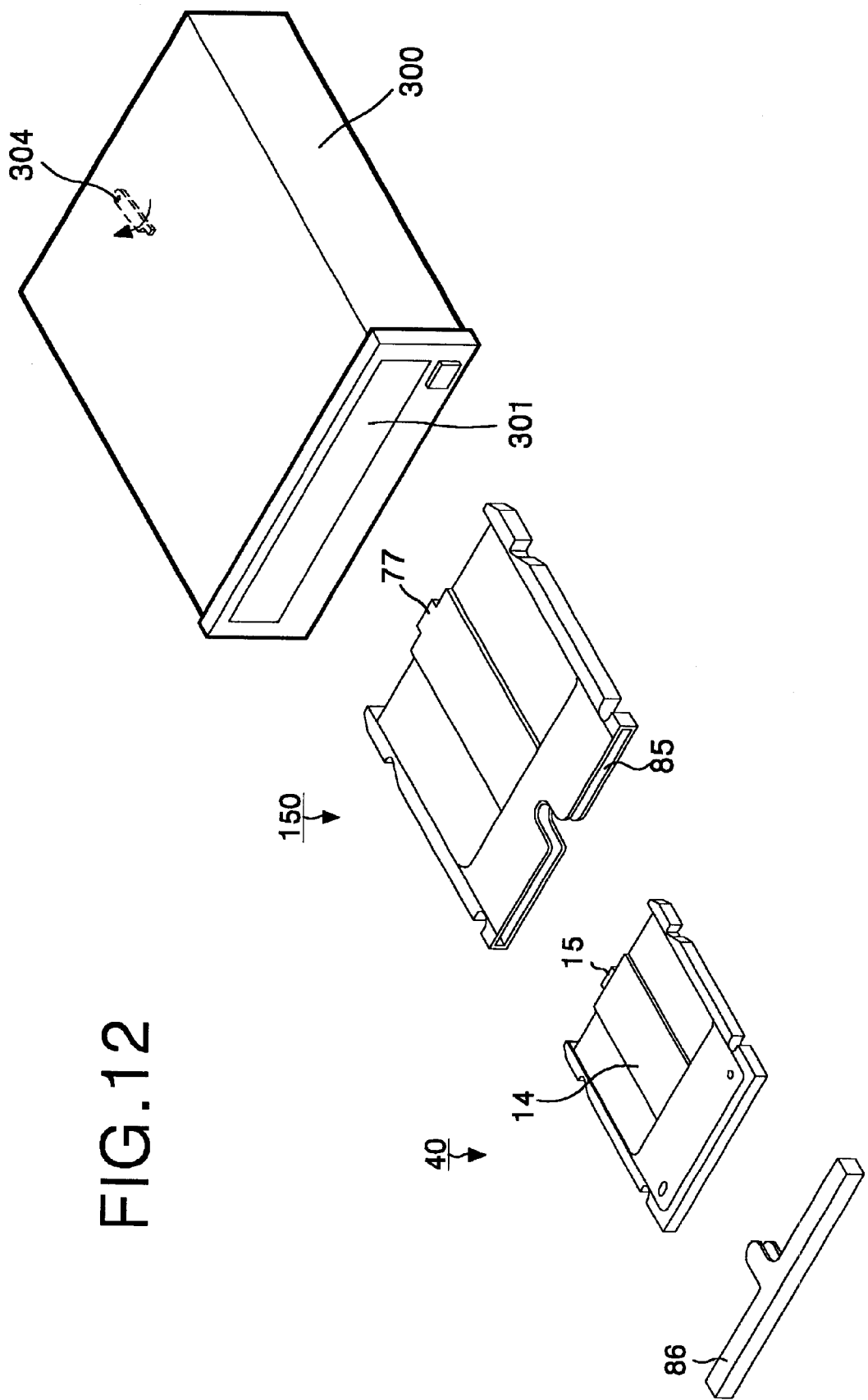
FIG. 12 is a perspective view depicting a procedure in which the disc cartridge adapter shown in FIG. 10 is loaded into a disc driving apparatus of insertion loading system.

FIG. 12 shows a procedure in which the disc cartridge adapter 150 shown in FIG. 10 is loaded into a disc driver of insertion loading system. Referring to FIG. 12, in the disc driver of insertion loading system, a user must push the disc cartridge adapter and put it into a disc access position because a tray is not installed. If a disc cartridge adapter 150 is loaded into the disc driver in a state in which the small-scale cartridge 40 is received, then the first and second sliders 77 and 78 are driven with a shutter opener 304. Then, the shutter 14 of the small-scale cartridge 40 is linked to the second slider 78 to be moved.

The disc cartridge adapter according to the present invention absorbs a travel range difference of the shutters to move the shutter of the small-scale cartridge, so that it is suitable for a case where a twin shutter type of small-scale cartridge including two shutters, hereinafter referred to as "twin shutter cartridge," is loaded into a disc driver.

Figure 13:
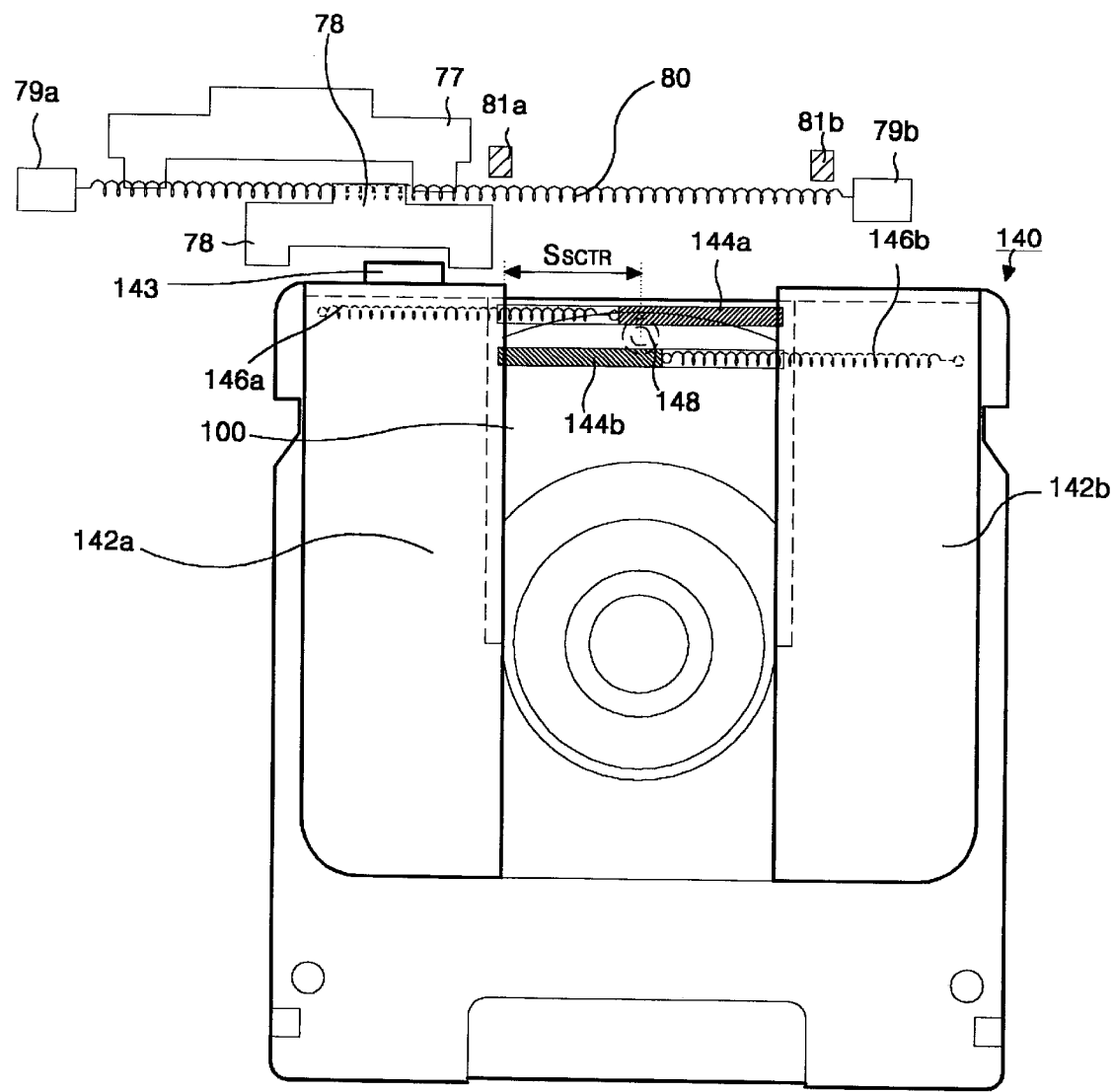
FIG. 13 is a plan view for explaining a process in which a twin shutter cartridge is driven with the disc cartridge adapter shown in FIG. 10.

Referring now to FIG. 13, a twin shutter cartridge 140 includes first and second shutters 142a and 142b, a pinion 148 and linear racks 144a and 144b for linking the first and second shutters 142a and 142b, and springs 146a and 146b for applying a restoring force to the first and second shutters 142a and 142b. when such a twin shutter cartridge 140 is loaded into the disc driver after being received within the disc cartridge adapter, the first and second shutters 142a and 142b are moved by a difference between a travel range absorbed by the first and second sliders 77 and 78 and a shutter travel range of the large-scale cartridge 42. At this time, the first and second shutters 142a and 142b are linked to the pinion 148 and the linear recess 144a and 144b when any one shutter is moved, thereby moving the other shutter in a contrary direction.

As described above, the disc cartridge adapter according to the present invention absorbs a shutter travel range difference between the large-scale cartridge and the small-scale cartridge to open the shutter of the small-scale cartridge, so that it permits the small-scale cartridge to be driven with a disc driver for driving the large scale cartridge. Also, the disc driver according to the present invention can changeably drive the cartridge adapter for receiving the small-scale cartridge and the large-scale cartridge. Moreover, the disc cartridge adapter according to the present invention can drive the first and second sliders in a bilateral direction, so that it is applicable to a disc having a single recording face as well as a disc having a double recording face.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A disc cartridge adapter for driving a small-scale cartridge having a shutter travel range relatively smaller than a shuttle travel range of a large-scale cartridge, said adapter comprising:
    a body with a receiving space for receiving the small-scale cartridge; and
    a driving power transfer device linked to the body, said driving power transfer device for absorbing a difference in a shutter travel range between the small-scale cartridge and the large-scale cartridge and including
        support sliders on the sides of the driving power transfer device,
        a first slider member installed on the body linearly-movably,
        a second slider member linked to the first slider member to drive a shutter of the small-scale cartridge, and
        a first elastic member for applying an elastic restoring force connected between the support sliders, said elastic member including a spring for generating an elastic restoring force,
            wherein the support sliders are linked to the first slider member while leaving the spring therebetween and restraining the second slider member for preventing a motion of the second slider member.

2. The disc cartridge adapter according to claim 1, wherein said first slider member comprises:
    a head to which a driving power is applied; and
    arms protruded at a desired space toward the second slider member.

3. The disc cartridge adapter according to claim 1, further comprising:
    a stopper member, being formed at the body, for limiting a travel range of the support slider.

4. The disc cartridge adapter according to claim 1, further comprising:
    a second elastic member for sticking the small-scale cartridge into one side of the receiving space to align it.

5. The disc cartridge adapter according to claim 1, wherein said receiving space has a square hole shape going through an upper surface and a lower surface of the body.

6. The disc cartridge adapter according to claim 1, further comprising:
    a support member for supporting the small-scale cartridge beneath.

7. The disc cartridge adapter according to claim 1, further comprising:
    a cartridge-inserting hole, being formed at the body for guiding the small-scale cartridge to the receiving space.

8. The disc cartridge adapter according to claim 7, further comprising:
    a holder member for opening and closing the cartridge-inserting hole.

9. The disc cartridge adapter according to claim 8, wherein said holder member is pivotally moved to be coupled with the body in a hinge shape in such a manner to open and close the cartridge-inserting hole.

10. A disc driving system, comprising:
    a disc drive for a relatively large-scale disc cartridge with a first shutter travel range;
    a small-scale disc cartridge with a second shutter and a second shutter travel range;
    an adapter defining a cavity for receiving the small-scale disc cartridge and including:
        a driving power transfer device, said driving power transfer device for absorbing a difference in the shutter travel range between the small-scale cartridge and the large-scale cartridge and including
        support sliders on the sides of the driving power transfer device,
        a first slider member installed on the adapter linearly-movably,
        a second slider member linked to the first slider member to drive the second shutter; and
        a first elastic member for applying an elastic restoring force and connected between the support sliders, said elastic member including a spring for generating an elastic restoring force,
            wherein the support sliders are linked to the first slider member while leaving the spring therebetween and restraining the second slider member for preventing a motion of the second slider member.

11. The disc driving system according to claim 10, wherein said small-scale cartridge comprises:
    a body provided with a desired size of opening and having a small-scale optical disc which is rotatable;
    first and second shutter members for opening and closing the opening; and
    a link for linking the first shutter member to the second shutter member in accordance with a driving of any one of the first and second shutter members.

12. The disc driving system according to claim 10, wherein, the disc drive includes
    a tray adapted to receive the adapter; and
    a drive unit which moves the tray linearly.

13. A disc cartridge adapter for driving a first shutter of first cartridge having a first travel range relatively smaller than a second travel range of a second shutter of a second cartridge, said adapter comprising:
    an opener for opening the first shutter in a first and a second direction, said opener including
        a slider for moving the shutter in the first and second direction,
        a first absorbing region on a first side of the slider for absorbing slider movement in the first direction, and
        a second absorbing region on the second side of the slider for absorbing slider movement in the second direction.

14. The disc cartridge adapter of claim 13, wherein the slider comprises:
    a first slider member defining a first region, said first slider member being symmetrical; and
    a second slider member being moveable within the first region and being symmetrical.

15. The disc cartridge adapter of claim 13, wherein the first cartridge is a double sided or single sided cartridge, and the opener opens either one side or both sides of the double sided cartridge without repositioning the cartridge in the adapter.

* * * * *